(12) United States Patent
Dowedeit

(10) Patent No.: US 7,657,559 B2
(45) Date of Patent: Feb. 2, 2010

(54) METHOD TO EXCHANGE OBJECTS BETWEEN OBJECT-ORIENTED AND NON-OBJECT-ORIENTED ENVIRONMENTS

(75) Inventor: Bernd Dowedeit, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 11/419,214

(22) Filed: May 19, 2006

(65) Prior Publication Data

US 2007/0050489 A1   Mar. 1, 2007

(30) Foreign Application Priority Data

Aug. 23, 2005   (EP) .................................. 05107735

(51) Int. Cl.
*G06F 17/30*   (2006.01)
(52) U.S. Cl. .................................. 707/103 R
(58) Field of Classification Search ............... 707/2, 707/10, 103 R
See application file for complete search history.

(56) References Cited

U.S. PATENT DOCUMENTS 6,035,303 A * 3/2000 Baer et al. .............. 707/103 R 6,125,400 A * 9/2000 Cohen et al. ................. 709/247

OTHER PUBLICATIONS

"Class XMLEncoder", XMLEncoder, Java 2 Platform Std. Ed. v1.4. 2, http://java.sun.com/j2se/1.4.2/docs/api/java/beans/XMLEncoder. html, 6 pages.
"Class XMLDecoder", XMLDecoder, Java 2 Platform Std. Ed. v1.4. 2, http://java.sun.com/j2se/1.4.2/docs/api/java/beans/XMLDecoder. html, 4 pages.

* cited by examiner

*Primary Examiner*—Etienne P LeRoux
(74) *Attorney, Agent, or Firm*—Stephen R. Tkacs; Stephen J. Walder, Jr.; Jeffrey S. LaBaw

(57) ABSTRACT

A mechanism is provided to exchange information comprised in objects between object-oriented and non-object-oriented environments. The mechanism converts an object or a collection of objects into key-value-pairs clearly assigned to its originate object and vice versa. The mechanism feeds the keys and the values of the clearly assigned key-value-pairs one-by-one into a data stream to be used to transport information comprised in the objects from an object-oriented to a non-object-oriented environment and vice versa. Each key and/or value is only fed one time into the data stream and is then replaced by a placeholder referring to the key and/or value already sent.

16 Claims, 3 Drawing Sheets

Figure 1:
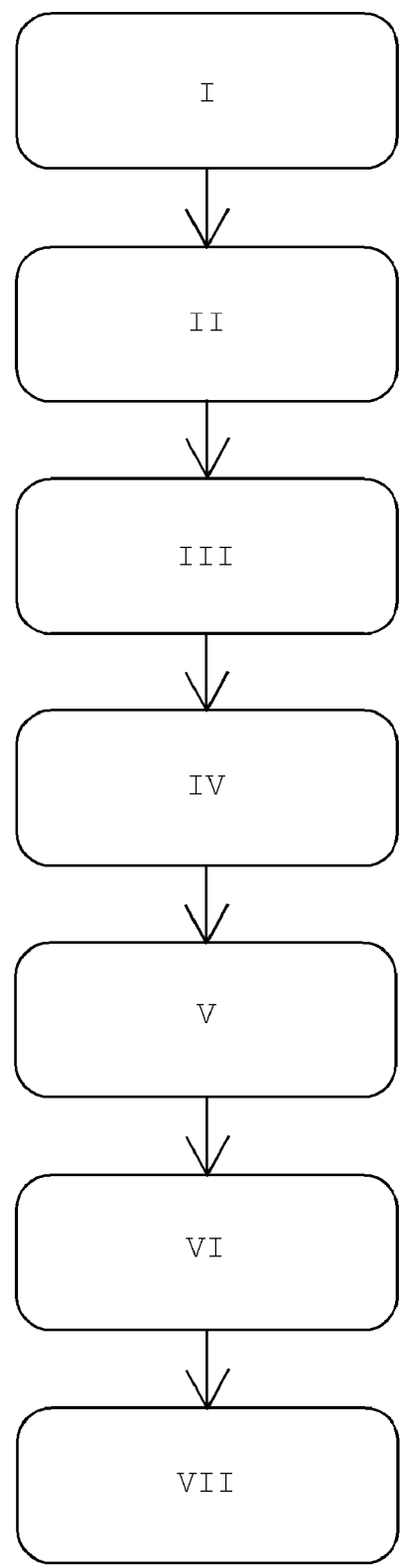

```
#INGSTREAM#2110 #2   #1#41 #510 2 3 4 5 6 7 8 9 10 11 #510 12 13 14 15 16 17 18 19
#1#418 #57 20 21 22 23 24 25 26 #57 27 28 29 30 31 32 32 #1#433 #51 34 #51 35 #1#436
#55 37 38 39 40 41 #55 42 43 44 45 46 #1#447 #58 48 49 50 51 52 53 54 55 #58 56 57
58 59 60 60 32 32 #1#461 #547 34 62 63 64 65 66 67 68 69 70 71 72 73 74 75 76 77 78
79 80 81 82 83 84 85 86 87 88 89 90 91 92 93 94 95 96 97 98 99 100 101 102 103 104
105 106 107 #547 108 109    110    111       112 113 114 114    32 32 44 115 115 44 112 112
44 116 116 44 30 30 44 117 117 44 118 118 44 119 119 44     44    44 120 120 #1#4121
#510 122 123 124 125 126 127 128 129 130 131 #510 12 28         132    32 32 #1#4133 #514
134 135 136 137 138 139 140 141 142 143 144 145 146 147 #514 148 149 44 28 28 44 29
29 44 150 151 44 152 152 #1#419 #56 153 154 155 156 157 158 #56 44 159 160 44 14 161
#9   METADATA 2 OTaskDomainName 3 OTaskOperationName 4 OTaskRequestorName 5
OTaskCreationTime 6 OTaskExpirationTime 7 OTaskLanguage 8 OTaskInputElementClass 9
OTaskOutputElementClass 10 OTaskReturnCode 11 OTaskReasonCode 12 TestDomain 13
EXECUTE_SOLICITED_REQUEST 14 Bernd 15 2003-12-24 23:07:59 +0100 16 2004-01-06
23:59:59 +0100 17 ENUS 18 REQUEST 19 PROPERTY 20 ORequest.OResourceName 21
ORequest.OName 22 ORequest.OType 23 ORequest.OSource 24 ORequest.OComment 25
ORequest.OParmlist.OName.0 26 ORequest.OParmlist.OValue.0 27 DB2/APL/KEY4 28 Online
29 TypeE2E 30 OPERATOR 31 Das ist ein Kommentar. 32 0 33 RESKEY 34 OResource.OName
35 MQS/APL/KEY4 36 FILTER 37 OFilter.OName 38 OFilter.OOperation 39 OFilter.OValue.0
40 OFilter.OValue.1 41 OFilter.OValue.2 42 filterResourceName 43 = 44 2 45 DB2* 46
SAP* 47 RELATION 48 ORelation.OSourceName 49 ORelation.OTargetName 50
ORelation.OName 51 ORelation.OType 52 ORelation.OSourceType 53 ORelation.OTargetType
54 ORelation.OProperty.OName.0 55 ORelation.OProperty.OValue.0 56 CICS/APL/KEY4 57
VTAM/APL/KEY4 58 HasParent 59 typeResourceToResource 60 1 61 RESOURCE 62
OResource.OType 63 OResource.ODesiredState 64 OResource.OObservedState 65
OResource.OOperationalState 66 OResource.OCompoundState 67 OResource.ODisplayString
68 OResource.ODescription 69 OResource.OOwner 70 OResource.OExtLink 71
OResource.OIsIncludedForAutomation 72 OResource.OGroupClass 73
OResource.OAvailTargetMin 74 OResource.OAvailTargetMax 75
OResource.ODefaultDesiredState 76 OResource.OProperty.OName.0 77
OResource.OProperty.OValue.0 78 OResource.ORequest.OIsWinning.0 79
OResource.ORequest.OIsWinning.1 80 OResource.ORequest.OIsWinning.2 81
OResource.ORequest.OIsVote.0 82 OResource.ORequest.OIsVote.1 83
OResource.ORequest.OIsVote.2 84 OResource.ORequest.OSource.0 85
OResource.ORequest.OSource.1 86 OResource.ORequest.OSource.2 87
OResource.ORequest.OOpid.0 88 OResource.ORequest.OOpid.1 89
OResource.ORequest.OOpid.2 90 OResource.ORequest.OPriority.0 91
OResource.ORequest.OPriority.1 92 OResource.ORequest.OPriority.2 93
OResource.ORequest.OAction.0 94 OResource.ORequest.OAction.1 95
OResource.ORequest.OAction.2 96 OResource.ORequest.OInfo.0 97
OResource.ORequest.OInfo.1 98 OResource.ORequest.OInfo.2 99
OResource.ORequest.OCreationTime.0 100 OResource.ORequest.OCreationTime.1 101
OResource.ORequest.OCreationTime.2 102 OResource.ORequest.OExpirationTime.0 103
OResource.ORequest.OExpirationTime.1 104 OResource.ORequest.OExpirationTime.2 105
OResource.ORequest.OComment.0 106 OResource.ORequest.OComment.1 107
OResource.ORequest.OComment.2 108 SAP/GRP/KEY4 109 typeResourceGroup 110 online 111
SAP_Group 112 true 113 Move 114 3 115 false 116 BDOW 117 HIGH 118 requestOffline 119
some request info 120 Thomas PMR: abc!_äöü_?#*&%$_END 121 DOMAIN 122
ODomain.ODomainName 123 ODomain.ODomainState 124 ODomain.OAutoLocation 125
ODomain.OAutoProdName 126 ODomain.OAutoversion 127 ODomain.OAutoStartupTime 128
ODomain.OPolicyName 129 ODomain.OPolicyActivationTime 130 ODomain.OProperty.OName.0
131 ODomain.OProperty.OValue.0 132 SYS1.SA23.POLICY 133 EXCEPTION 134
OException.ORetCode 135 OException.OText 136 OException.ORequest.OName.0 137
OException.ORequest.OName.1 138 OException.ORequest.OName.2 139
OException.ORequest.OType.0 140 OException.ORequest.OType.1 141
OException.ORequest.OType.2 142 OException.ORequest.OResourceName.0 143
OException.ORequest.OResourceName.1 144 OException.ORequest.OResourceName.2 145
OException.ORequest.OInfo.0 146 OException.ORequest.OInfo.1 147
OException.ORequest.OInfo.2 148 12345 149 AOF350E Test message. 150 DB2/APL/KEY1 151
CICS/APL/KEY1 152 AOFNNN Error Message per Request. 153 OProperty.OName.0 154
OProperty.OName.1 155 OProperty.OName.2 156 OProperty.OValue.0 157
OProperty.OValue.1 158 OProperty.OValue.2 159 first-name 160 last-name 161 Dowedeit
```

Fig. 3

METHOD TO EXCHANGE OBJECTS BETWEEN OBJECT-ORIENTED AND NON-OBJECT-ORIENTED ENVIRONMENTS

TECHNICAL FIELD

The invention relates to a method to exchange information comprised in objects between object-oriented and non-object-oriented environments.

BACKGROUND OF THE INVENTION

To exchange objects between object oriented environments, such as Java, C++ and the like, and non-object-oriented environments such as NetView, z/OS batch programs, z/OS REXX programs, some scripting languages and the like is a key requirement for system automation technology within multi-platform networks. An example for a component within a multi-platform network that requires to exchange objects between object oriented environments and non-object-oriented environments is an end-to-end adapter for z/OS.

To exchange objects within object oriented environments it is known to use an Extended Markup Language (XML) serialization by using a XML encoder and a XML decoder. To exchange objects between object-oriented and non-object-oriented environments, the latter requires an XML parser. Thereby the problem arises that many non-object-oriented environments do not offer XML parsers. Furthermore XML parsers are very complex. So it would be very costly to port an existing XML parser, like e.g. an existing C/C++ parser into a non-object-oriented environment, like e.g. NetView. Additionally, a ported XML parser within a non-object-oriented environment would provide only bad performance, since for example C-performance is poor within NetView.

Furthermore, a XML parser works with uncompressed data only. Thereby a data stream being used to exchange objects between object-oriented and non-object-oriented environments cannot be compressed or has to be decompressed before being processed within the XML parser. This requires memory resources and due to this is also costly.

From U.S. Pat. No. 6,035,303 it is known to store and retrieve complex objects within a digital library by converting the objects into key-value-pairs. Thereby additional information is assigned to the key-value-pairs to retrieve them within the library. Doing so, it is possible to make objects persistent.

OBJECT OF THE INVENTION

The object of the invention is to develop a method that allows to exchange information comprised in objects between object-oriented and non-object-oriented environments without using an XML parser, plus a device to be used to execute such a method, plus a computer program product that allows to execute such a method on a computer.

METHOD OF THE INVENTION

The object of the invention is met by said method of said specifying features of claim 1 comprising the steps of:

conversion of an object or a collection of objects into key-value-pairs clearly assigned to its originate object and vice versa, feeding the keys and the values of said clearly assigned key-value-pairs preferably in a well defined order one-by-one into a data stream to be used to transport information comprised in said objects from an object-oriented to a non-object-oriented environment and vice versa, wherein each key and/or value is only fed one time into the data stream and is otherwise replaced by a placeholder referring to said key and/or value fed into the data stream.

Thereby, each attribute of an object is converted into one key-value-pair, preferably by using a naming convention that allows to clearly identify objects and assigned key-value-pairs and vice versa. Typically an object comprises many attributes resulting in many key-value-pairs after conversion. Because many keys and many values within said many key-value pairs are equal, the method according to the invention only feeds each key and each value only one time into the data stream, wherein if the same key or value occurs a second or a more often time this key or value is replaced by a placeholder referring to said key or value being fed one time into the data stream. Thereby replacing is not limited to keys and values.

Said method with the specifying features of claim 1 has the advantage over the state of the art, that no XML parser is required. Both, the object-oriented and non-object-oriented environment are able to handle key-value-pairs. By using e.g. a naming convention known to both environments that allows clearly assigning the key-value-pairs to an object and vice versa, information comprised within the objects can be exchanged between both environments.

In a preferred embodiment of the invention, a dictionary is generated comprising at least each key and each value received when converting said objects or said collection of objects into key-value-pairs and also comprising said placeholders each one being clearly assigned to one key or one value, wherein said dictionary is provided to both, the sender and the receiver side of said data stream, and wherein the placeholders comprised within the data stream refer to said dictionary.

By using a dictionary the data stream is automatically compressed because it allows to use placeholders within the data stream referring to keys and values stored within said dictionary instead of feeding the full information like e.g. several times the same keys and the same values and the like into the data stream. Doing so, a significant compression of the data stream is reached, since the placeholders fed into the data stream require much less memory than the keys and values of the key-value-pairs. Thereby at least the keys and the values of the key-value-pairs are fed only one time into the data stream, wherein keys and values that would occur several times within the data stream are transported only one time within the data stream, wherein identical keys and values are replaced by placeholders clearly referring to said keys and values already transported or comprised within said dictionary. By using a dictionary, the non-object-oriented environment can directly access the keys and the values without decompressing the data stream. This saves a lot of memory.

Thereby it is thinkable to generate said dictionary dynamically wherein each key and each value appearing the very first time when converting the object or the collection of objects into key-value-pairs gets a clearly assigned placeholder and is put into the dictionary on the receiver side together with said placeholder before being fed into the data stream, and wherein each key and each value received on the receiver side gets the same clearly assigned placeholder as on the sender side and then is put into the dictionary on the receiver side together with said placeholder. Doing so, all strings like keys, values and types ever fed into the data stream together with their clearly assigned placeholders are put one time into the dictionary and can be referred by its placeholders. By e.g.

using successive placeholders, it is easy to assign the same placeholders to the same keys, values and types on both, the sender and the receiver side.

It is also thinkable to generate said dictionary on the sender side when converting the object or the collection of objects into key-value-pairs, and to transmit said dictionary within said data stream. Thereby preferably all keys and values being sent only one time within the data stream are comprised within the dictionary, wherein the key-value-pairs representing the objects or the attributes of the objects are replaced by placeholders referring to said dictionary.

In a preferred embodiment of the invention, said dictionary is fractionized into several parts being sent one-by-one within said data stream. Thereby the parts of the dictionary preferably are sent between the placeholders referring to the keys and the values of the key-value-pairs being assigned to the objects, wherein each part is sufficient to replace the preceding and/or the following keys and values clearly assigned to an object or a collection of objects within said data stream by placeholders until the next part of the dictionary is sent.

In another preferred embodiment of the invention, at least the keys and the values of each object respectively their placeholders referring to said keys and values are pooled to elements comprised within said data stream.

Thereby it is thinkable that each element is opened by a string comprising the type of the object followed by the keys and the values of the object.

In a preferred embodiment of the invention, the dictionary also comprises the types of objects and placeholders clearly assigned to said types, wherein the types comprised within the data stream are replaced by said clearly assigned placeholders.

In a preferred embodiment of the invention, the data stream starts with a header followed by the elements each one comprising at least the placeholders for the keys and the values of an object and ends with the dictionary comprising at least all keys and values and their assigned placeholders.

Generally it is also thinkable that the dictionary comprises entire key-value-pairs and placeholders assigned to said entire key-value-pairs instead of keys and values, wherein each key-value-pair is fed only one time into the data stream and then is replaced by said placeholder. Doing so, the access to the key-value-pairs being represented by a key and a value assigned to said key is faster than by getting the key and the value separately out of the dictionary by using two placeholders.

In a preferred embodiment of the invention, at least a part of said dictionary comprising keys and values of well known or often used objects or classes of objects is permanently provided within the object-oriented and the non-object-oriented environment. Thereby it is foreseen to use said part of the dictionary for at least the keys and values often being transported within said data stream, wherein instead of these keys and values the data stream transports placeholders clearly referring to the keys and values stored in said part of the dictionary. Providing a part of said dictionary permanently can be reached by hard-coding said part of said dictionary into both environments. This solution has the advantage of compressing the data stream significant because keys and values stored in said e.g. hard coded part of the dictionary do not have to be transmitted within the data stream at all.

Generally it is thinkable that if a data stream uses placeholders referring to a hardcoded dictionary that is not transported together with the data stream then this data stream and the encoding/decoding device might be considered as an encryption mechanism that may be used to exchange secure data. This requires that the dictionary has been transported on a secure way.

In a preferred embodiment of the invention, a naming-convention is provided to the object-oriented and the non-object-oriented environment and is used to clearly assign the key-value-pairs to its originate object and vice versa. Thereby said naming convention allows identifying different objects and their clearly assigned key-value-pairs. Using a naming convention provides the advantage of a built-in encryption of the data stream. The naming convention preferably defines that the keys are combinations of class- and attribute names of the objects or synonyms for class and/or attribute-names and a numeration resulting e.g. from the collection of objects.

Another part of the technical purpose of the invention is met by a device according to claim 13, comprising means to convert objects into clearly assigned key-value-pairs and vice versa, means to feed the keys and/or the values of said clearly assigned key-value-pairs one time in a well defined order one-by-one into a data stream, means to feed placeholders into said data stream instead of the keys and values already sent, wherein each key and/or value is only fed one time into the data stream and is then replaced by a placeholder referring to said key and/or value already sent, and means to use said data stream to transport information comprised in said objects from an object-oriented environment to a non-object-oriented environment and vice versa.

Another preferred embodiment of said device according to the invention comprises means to generate a dictionary comprising at least the keys and the values received when converting the object or the collection of objects into key value pairs, and the placeholders assigned to said keys and values, wherein said dictionary is used to replace keys and values comprised within said data stream by placeholders referring to said dictionary.

Another preferred embodiment of the device according to the invention comprises means to provide said dictionary to both, the object-oriented and the non-object-oriented environment, and means to feed placeholders comprised within said dictionary into said data stream instead of the keys and values it selves, means to extract placeholders out of said data stream, and means to get at least the keys and the values comprised within said dictionary and being assigned to said placeholders.

Another preferred embodiment of said device according to the invention comprises means to provide a naming convention to both, the object-oriented and the non-object-oriented environment, wherein said naming convention is used to clearly identify different objects and their clearly assigned key-value-pairs.

In a particularly preferred embodiment of the invention, said method is performed by a computer program product stored on a computer usable medium comprising computer readable program means for causing a computer to perform the method mentioned above, when said computer program product is executed on a computer.

The foregoing, together with other objects, features, and advantages of this invention can be better appreciated with reference to the following specification, claims and drawings.

BRIEF DESCRIPTION OF THE DRAWING, WITH

Figure 2:
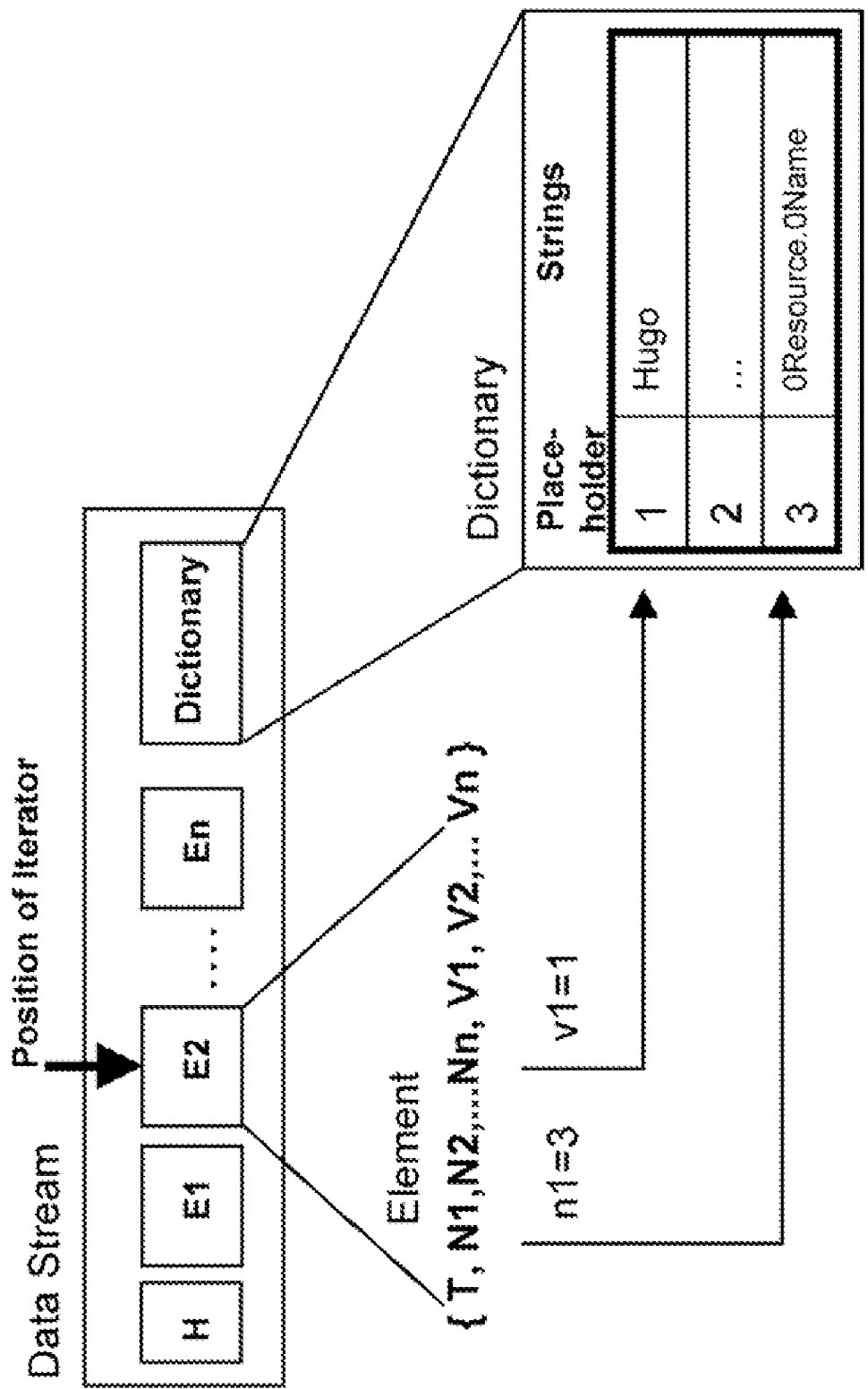

FIG. 1 showing a flowchart of the method according to the invention,

FIG. 2 showing an example for the architecture of the data stream, and

FIG. 3 showing an example of an implementation of a data stream according to the invention.

In FIG. 1 the steps to be used to execute the method according to the invention are shown.

In a first step I a naming convention is provided that allows to identify objects and key-value-pairs clearly assigned to said objects. The naming convention is provided to both, the object-oriented and the non-object-oriented environment. This allows encrypting the data stream used to exchange information between the environments. Preferably the naming convention is hard coded in both environments.

In a second step II objects or collections of objects are converted into key-value-pairs clearly assigned to its originate objects. The conversion of objects into key-value-pairs is done by fractionizing the objects one-by-one into types, keys and values, wherein the naming of the keys is done by using the naming convention mentioned in step I.

In a third step III the types, keys and values are compared with a dictionary that comprises entries consisting of a placeholder and a string assigned to said placeholder. Said strings can be types, keys or values. Each string that is not comprised in the dictionary gets assigned a placeholder and is stored as an entry in said dictionary. Thereby the order of comparing the strings with the entries of the dictionary is equal with the order the objects are converted into keys and values assigned to said keys. Also the placeholders are assigned in the same order, e.g. by raising the particular placeholder by one for each string not comprised within said dictionary.

In a fourth step IV, the strings to be fed into the data stream are replaced by their placeholders referring to the particular string stored within the dictionary.

In a fifth step V, the placeholders assigned to the strings belonging to the objects converted into key-value-pairs are fed into the data stream, wherein all strings respectively their placeholders that belong to one object are pooled to an element within said data stream. This is done to get a simple architecture of the data stream shown in FIG. 2. Thereby the data stream starts with a header H followed by the elements E1, E2, . . . , En, each one comprising all strings T, N1, N2, . . . , Nn, V1, V2, . . . , Vn of one object respectively their placeholders. A placeholder assigned to a string that is the type T of the particular object preferably opens the particular element E1, E2, . . . , En representing the object, followed by the placeholders assigned to the keys N1, N2, . . . Nn and values V1, V2, . . . , Vn of said object.

In a sixth step VI the data stream is closed by the dictionary transmitted within the data stream (FIG. 2). Thereby the simple architecture of the dictionary can be seen in FIG. 2.

In a seventh step VII the data stream is received wherein the receiver can access the strings comprised within the data stream directly without decompressing the data stream by using the placeholders referring to the strings stored within said dictionary.

It is important to mention that the dictionary can also be generated dynamically on both, the object oriented and the non-object oriented environments, wherein each string is fed one time into the data stream, e.g. into the element that comprises said string the very first time. By extracting the strings one-by-one out of the data stream in the order they are fed into the data stream, a dictionary can be generated on both sides without exchanging said dictionary between the environments.

It is also thinkable to generate small dictionaries each one comprising strings that are not transmitted within the data stream before. Doing so, only small dictionaries have to be transmitted, wherein on the receiver side all small dictionaries can be combined to a large dictionary.

In the following a more specific explanation of the invention is given:

First, a definition of a naming-convention for java classes, object attributes and collections of objects is provided.

Second, a converter is provided that converts collections of java objects to a set of key-value-pairs and vice versa according to the naming-convention mentioned above. Said converter can be implemented in one of the following ways:

Hard coded for well-known classes,

Generator that generates a converter for any class depending on a class specification automatically, Using Java reflections.

Third, an architecture of a data stream that comprises the keys and the values in a way a conversion back to an array of objects is possible is provided. Thereby it is important to mention, that the simpler the data stream is, the cheaper the implementation of the converter gets. Thereby the converter is preferably implemented by using programming languages such as Assembler, REXX and the like. The data stream according to the invention provides built-in data compression, since preferably each type, key and value assigned to an object is only fed one time into the data stream.

Fourth a technique is used wherein the converter feeds each key or value only one time into the data-stream, wherein short identifiers, herein called placeholders, are used for multiple occurrences of the same key/value instead. This can be done by generating a dictionary comprising all strings required and by transmitting said dictionary via said data stream. It is also thinkable to transmit the strings the very first time they occur within the data stream, wherein a dictionary is built up dynamically on both sides. In the following the strings are replaced by placeholders referring to said dictionary, wherein these placeholders represent the strings within the data stream when occurring the following time. Doing so, a compression of about $\frac{1}{10}$ (in average) or for a large amount of objects $\frac{1}{20}$ is reached compared with an XML data-stream. Thereby no deflation of compressed data occurs and the data can remain inflated all the time. This technology saves resources and particularly memory. This is very important especially if existing data-transport-devices are used that are designed for reasonable memory usage.

Generally it is thinkable to use a dot-notation especially for the REXX language specification. Using REXX, the keys can be used directly as stem indices. An example therefore is the retrieval of the attribute 'name' from an object of class Resource, where the say-instruction writes the result to an output device:

say "Resource Name=" object.0Resource.0Name

It is important to mention, that it is thinkable to use a dynamic dictionary instead of a static dictionary. Thereby not all strings required are transmitted at once. They are transmitted only when they are required. For example it is thinkable that if a large amount of objects like e.g. 1.000.000 objects each one being fractionized into 25 key-value-pairs has to be transmitted, instead of one large packet of 25.000.000 key-value-pairs 1000 small packets of 25.000 key-value-pairs are transmitted. Thereby it is thinkable that each time the dictionary changes, such a small packet updates the dictionary.

Generally also thinkable to use a totally dynamic dictionary that is getting all new key-value-pairs fed into and extracted out of the data stream one-by-one. Doing so no additional data like e.g. the dictionary itself has to be transmitted.

In the following an example for a naming convention according to the invention is explained. After the java objects are transported to the non-java environment, like e.g. Net-View, iteration through collection of resource-requests may be coded in REXX as follows:

Do i=1 to object.0Resource.0Request.0Opid.0
    Say 'Operator name of i-th request:',
    object.0Resource.0Request.0Opid.i
    End Thereby the concatenation operator is a dot '.' It concatenates the class name with the attribute name. If there is a collection of objects the 'n' determines the n-th collection element. The '.0' counts the number of elements in the collection. Thereby any number of nesting is possible.

EXAMPLES

Java classes are EEZResource, EEZRequest. Supported are collection-classes that allow iterating through the list of resources. A resource contains itself a list of requests.

| Key | Value |
|---|---|
| 0Resource.0Name | CICS |
| 0Resource.0Type | APL |
| 0Resource.0Request.0Source0 | 2 |
| 0Resource.0Request.0Opid0 | 2 |
| 0Resource.0Request.0Action0 | 2 |
| 0Resource.0Request.0Source1 | OPERATOR |
| 0Resource.0Request.0Opid1 | BDOW |
| 0Resource.0Request.0Action1 | Online |
| 0Resource.0Request.0Source2 | E2EMGR |
| 0Resource.0Request.0Opid2 | HUGO |
| 0Resource.0Request.0Action2 | Offline |

In the following the architecture of the data-stream shown in FIG. 2 is explained. The data stream provides a list of one or multiple elements E1, E2, ..., En. The elements E1, E2, ..., En allow a simple iteration of the first level of collection of objects. This reduces the size of the dictionary significantly if there are a large number of similar objects.

E.g., in order to retrieve the attribute 0Resource.0Name from the data stream shown in FIG. 2, the non-object-oriented program iterates over the elements E1, E2, ..., En in the data stream. For a data element E1, E2, ..., En, each one representing the object attributes of one object, at the current position it retrieves the attribute with name 0Resource.0Name using following algorithm:

1. Resolve the array of attribute-name-placeholders (N1, ..., Nn) to an array of real attribute names using the dictionary,
2. Find the given attribute name 0Resource.0Name and return the placeholder of the corresponding value from (V1, ..., Vn),
3. Use the placeholder of the corresponding value to get the string for the value of the input attribute via the dictionary.

For performance reasons the dictionary is an array of strings and the placeholder is the index (1, 2, 3, ...) into the array.

The data stream is divided in following parts, each is preceded by a tag.

| | |
|---|---|
| <Header> | H |
| <Element> | E1 |
| <ClassType><Array of names><Array of values> | $T_{E1}, N_{E1}, V_{E1}$ |
| <Element> | E2 |

-continued

| | |
|---|---|
| <ClassType><Array of names><Array of values> | $T_{E2}, N_{E2}, V_{E2}$ |
| ... | |
| <End> | |
| <Dictionary> | |

The header H identifies the stream with an eyecatcher and contains the stream version and number of elements E1, E2, ..., En or −1 if not known. A data element is recognized by the tag #1 and continues until next element E1, E2, ..., En or until end tag #9. The dictionary is placed behind the end tag. The dictionary consists of any number of pairs. Such a pair consists of a number and any string. The number is the so called placeholder.

The structure of an implementation of the data stream according to the invention can be seen best in the following example that is extracted from the data stream shown in FIG. 3.

| | |
|---|---|
| Header | #INGSTREAM#2110 #2-1 |
| Name/Value array | #1#41 #510 2 3 4 5 6 7 8 9 10 11 #510 12 13 14 15 16 17 18 19 |
| Name/value array | #1#418 #57 20 21 22 23 24 25 26 #57 27 28 29 30 31 32 |
| ... | |
| End + Dictionary | #9☐☐1 METADATA 2 0TaskDomainName 3 ... 160 last-name 161 Dowedeit |

Analyzing the first key/value array it can be seen the element tag (#1) followed by a string-tag (#4) and its value 1. Looking into the dictionary the value 1 refers to the string METADATA. This means that the key/value array is of type (class) METADATA. A string array starts with tag (#5). The first string-array defines the attribute names and the second one the attribute values. The first string-array-tag (#5) is followed by the dimension of the array (10) and by the 10 placeholder (2 3 4 5 6 7 8 9 10 11). Using the dictionary it is possible to resolve the placeholder 2 in the string 0TaskDomainName. The corresponding attribute placeholder 12 results in the string TestDomain (this means 0TaskDomainName=TestDomain). The end-tag (#9) closes the list of elements. The 2-bytes hex '0000' determines the begin of the dictionary (☐☐1 METADATA) with the first pair where 1 is the placeholder and METADATA the corresponding string. The dictionary in this example has 161 pairs.

More detailed explanation in order to read the tags within the data stream:

| Part | Identifier (tag) |
|---|---|
| Header example | #STREAM#2110#2-1 |
| Element | #1 |
| Single integer | #2 digits '00'x |
| Array of integers | #3 dimension digits-1 '00'x digits-2'00'x ... digits-n '00'x |
| Single string | #4 string '00'x |
| Array of strings | #5 dimension string-1 '00'x string-2'00'x ... string-n '00'x |
| End | #9 |
| Dictionary | '0000'x dict_id'00'x dict_value'00'x |

Thereby 'digits' is a sequence of numbers between 0, ..., 9, e.g. 237 and it will be interpreted as an integer. It can be preceded by a minus sign '-'.

A string can be anything but must not contain '00'x.

'dict_id' is a number 1, 2, 3, ....

'dict_value is a string. The numbers of the dict_id are sorted within the dictionary. They are used as placeholders for the corresponding strings.

While the present invention has been described in detail, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

COMMERCIAL APPLICABILITY

The invention is commercially applicable particularly in the field of system automation within multi-platform networks.

The invention claimed is:

1. A method, in a data processing system, to exchange information comprised in objects between object-oriented and non-object-oriented environments, comprising:
converting, by the data processing system, an object or a collection of objects into key-value-pairs clearly assigned to its originate object and vice versa, and
feeding, by the data processing system, the keys and the values of said clearly assigned key-value-pairs one-by-one into a data stream to be used to transport information comprised in said objects from an object-oriented to a non-object-oriented environment and vice versa,
wherein each key and/or value is only fed one time into the data stream and is then replaced by a placeholder referring to said key and/or value already sent.

2. The method according to claim 1,
wherein a dictionary is generated comprising at least each key and each value received when converting said objects or said collection of objects into key-value-pairs and also comprising said placeholders each one being clearly assigned to one key or one value,
wherein said dictionary is provided to both, the sender and the receiver side of said data stream, and wherein the placeholders comprised within the data stream refer to said dictionary.

3. The method according to claim 2,
wherein said dictionary is generated dynamically wherein each key and each value appearing the very first time when converting the object or the collection of objects into key-value-pairs gets a clearly assigned placeholder and is put into the dictionary on the receiver side before being fed into the data stream, and wherein each key and each value received on the receiver side gets the same clearly assigned placeholder as on the sender side and then is put into the dictionary on the receiver side.

4. The method according to claim 2,
wherein said dictionary is generated on the sender side when converting the object or the collection of objects into key-value-pairs, and wherein said dictionary is sent within said data stream.

5. The method according to claim 4,
wherein said dictionary is fractionized into several parts being sent one-by-one within said data stream.

6. The method according to one of the previous claims, wherein at least the keys and the values of each object respectively their placeholders referring to said keys and values are pooled to elements comprised within said data stream.

7. The method according to claim 6,
wherein each element is opened by a string comprising the type of the object followed by the keys and the values of the object.

8. The method according to claim 7,
wherein the dictionary also comprises the types of objects and placeholders clearly assigned to said types, wherein the types within the data stream are replaced by said clearly assigned placeholders.

9. The method according to claim 2,
wherein the data stream starts with a header followed by the elements each one comprising at least the placeholders for the keys and the values of an object and ends with the dictionary comprising at least all keys and values and their assigned placeholders.

10. The method according to claim 2, wherein the dictionary comprises entire key-value-pairs and placeholders assigned to said entire key-value-pairs, wherein each key-value-pair is fed only one time into the data stream and then is replaced by said placeholder.

11. The method according to claim 2, wherein at least apart of said dictionary comprising key-value-pairs of well known or often used objects or classes of objects is permanently provided within the object-oriented and the non-object-oriented environment.

12. The method according to claim 1, wherein a naming-convention is used to clearly assign the key-value-pairs to its originate object and vice versa.

13. A computer device to be used to exchange information, comprising:
means to convert objects into clearly assigned key-value-pairs and vice versa, means to feed the keys and/or the values of said clearly assigned key-value-pairs one time one-by-one into a data stream,
means to feed placeholders into said data stream instead of the keys and values already sent, and
means to use said data stream to transport information comprised in said objects from an object-oriented environment to a non-object-oriented environment and vice versa.

14. The device according to claim 13, comprising means to generate a dictionary comprising at least the keys and the values received when converting the object or the collection of objects into key value pairs, and the placeholders assigned to said keys and values.

15. The device according to claim 13, comprising means to provide said dictionary to both, the object-oriented and the non-object-oriented environment, means to feed placeholders comprised within said dictionary into said data stream instead of the keys and values it selves, means to extract placeholders out of said data stream and means to get at least the keys and the values comprised within said dictionary and being assigned to said placeholders.

16. A computer program product in a computer storage medium having a computer readable program stored thereon, wherein the computer readable program, when executed on a computer device, causes the computer device to:
convert an object or a collection of objects into key-value-pairs clearly assigned to its originate object and vice versa, and
feed the keys and the values of said clearly assigned key-value-pairs one-by-one into a data stream to be used to transport information comprised in said objects from an object-oriented to a non-object-oriented environment and vice versa,
wherein each key and/or value is only fed one time into the data stream and is then replaced by a placeholder referring to said key and/or value already sent.

* * * * *